(12) United States Patent
Bergida et al.

(10) Patent No.: US 10,793,345 B2
(45) Date of Patent: Oct. 6, 2020

(54) PRE-FILLED WINE GLASS PRODUCT (71) Applicant: CELEBRATE EVERYWHERE, LLC, Front Royal, VA (US)

(72) Inventors: John R. Bergida, Front Royal, VA (US); Marvin M. Bergida, Front Royal, VA (US)

(73) Assignee: CELEBRATE EVERYWHERE, LLC, Front Royal, VA (US)

( * ) Notice: Subject to any disclaimer, the term of this patent is extended or adjusted under 35 U.S.C. 154(b) by 0 days.

(21) Appl. No.: 16/795,728

(22) Filed: Feb. 20, 2020

(65) Prior Publication Data

US 2020/0189840 A1 Jun. 18, 2020

Related U.S. Application Data (63) Continuation of application No. 14/177,387, filed on Feb. 11, 2014, now Pat. No. 10,604,336, which is a continuation-in-part of application No. 13/240,194, filed on Sep. 22, 2011, now abandoned, and a continuation-in-part of application No. 14/029,020, filed on Sep. 17, 2013, now Pat. No. 9,821,930, which is a continuation-in-part of application No. 13/240,194, filed on Sep. 22, 2011, now abandoned.

(60) Provisional application No. 61/895,028, filed on Oct. 24, 2013, provisional application No. 61/703,637, filed on Sep. 20, 2012.

(51) Int. Cl.
  *B65D 85/72* (2006.01)
  *C12G 1/00* (2019.01)

(52) U.S. Cl.
  CPC ............... *B65D 85/72* (2013.01); *C12G 1/00* (2013.01)

(58) Field of Classification Search
  CPC .... B65D 85/72; B65D 41/17; B65D 43/0231; B65D 81/2015; B65D 1/0246; A47G 19/2205
  USPC .......................................................... 215/329
  See application file for complete search history.

(56) References Cited

U.S. PATENT DOCUMENTS

| | | | |
|---|---|---|---|
| D5,261 S | * | 9/1871 | Miller ............................. D7/527 |
| D22,497 S | | 6/1893 | Rauchfuss |
| 640,860 A | * | 1/1900 | Baum, Jr. ................ B65D 1/06 |
| | | | 215/377 |

(Continued)

FOREIGN PATENT DOCUMENTS

| | | |
|---|---|---|
| DE | 4109886 A1 | 10/1992 |
| DE | 10122951 A1 | 1/2003 |

(Continued)

*Primary Examiner* — Ernesto A Grano
(74) *Attorney, Agent, or Firm* — Buchanan Ingersoll & Rooney PC (57) ABSTRACT

A pre-filled stemmed glass has product sealed inside using a rigid lock-on cap. The stemmed glass illustratively includes a circumferential ledge with a groove against which the bottom rim of the cap seats, creating a liquid resistant barrier that could help prevent liquid from penetrating under the cap from the outside, if desired. The stemmed glass has a rim with a rounded profile at the outside surface of the glass and a flat profile on the inside surface thereof, facilitating injection-molding manufacture of the glass. The ledge and the lower rim of the cap of the stemmed glass have the same diameter, which facilitates the filling with product and capping of the stemmed glass by high-speed filling and capping machinery.

13 Claims, 9 Drawing Sheets

(56) References Cited

U.S. PATENT DOCUMENTS

| | | | |
|---|---|---|---|
| 728,981 A | 5/1903 | Rose | |
| D38,969 S | 12/1907 | Buskey | |
| D41,341 S | 5/1911 | Gredelue | |
| D42,348 S | 3/1912 | Bottome | |
| D42,994 S | 9/1912 | Gunthel | |
| D43,568 S | 2/1913 | Heinzelman | |
| D43,569 S | 2/1913 | Heinzelman | |
| D46,806 S | 12/1914 | Krall | |
| D47,451 S | 6/1915 | Bottome | |
| D48,081 S | 11/1915 | Provance | |
| D48,706 S | 3/1916 | Bottome | |
| 1,243,033 A | 10/1917 | Beatty | |
| D52,301 S | 8/1918 | Bottome | |
| 1,351,496 A | 8/1920 | Horace | |
| D65,041 S | 7/1924 | Adams | |
| D75,836 S | 7/1928 | Giese | |
| D95,593 S | 5/1935 | Kramer | |
| 2,057,972 A | 10/1936 | Edward | |
| 2,172,544 A | 9/1939 | Panter | |
| D120,226 S | 4/1940 | Lundy | |
| D121,573 S | 7/1940 | Lundy | |
| 2,345,737 A | 4/1944 | Fabrice | |
| 2,372,156 A * | 3/1945 | Buchman | B65D 41/0442 215/337 |
| 2,465,662 A | 3/1949 | Sanford | |
| D156,083 S | 11/1949 | Ferree | |
| D163,564 S | 6/1951 | Brown et al. | |
| 2,609,955 A | 9/1952 | Dean | |
| 2,700,249 A | 1/1955 | Samuel | |
| 2,752,060 A | 6/1956 | Martin | |
| 2,766,796 A | 10/1956 | Tupper | |
| 2,996,208 A | 8/1961 | Schroeder | |
| 3,089,603 A | 5/1963 | Laurance | |
| 3,089,605 A | 5/1963 | Buonauro | |
| D195,981 S | 8/1963 | Lorenzen | |
| 3,140,007 A | 7/1964 | Nettleship | |
| 3,253,726 A | 5/1966 | John | |
| 3,349,950 A | 10/1967 | Wanderer | |
| 3,369,687 A | 2/1968 | Walls | |
| 3,402,844 A | 9/1968 | Chin | |
| 3,482,731 A * | 12/1969 | Douty | B65D 7/04 220/630 |
| 3,526,335 A | 9/1970 | Swett et al. | |
| 3,559,832 A | 2/1971 | Balducci | |
| 3,695,475 A | 10/1972 | Ruekberg | |
| 3,833,141 A | 9/1974 | Leitz | |
| D234,448 S * | 3/1975 | Achenbach | D7/524 |
| 3,923,181 A | 12/1975 | Libit | |
| 4,101,044 A | 7/1978 | Paquette et al. | |
| D254,831 S | 4/1980 | Smith | |
| D258,925 S * | 4/1981 | Perrin | D7/537 |
| 4,289,248 A | 9/1981 | Lynn | |
| 4,363,479 A * | 12/1982 | Urasaki | A47G 19/2227 215/6 |
| D298,397 S * | 11/1988 | Durand | D7/525 |
| 4,834,251 A | 5/1989 | Yu | |
| 4,858,758 A | 8/1989 | Mitchell et al. | |
| 4,948,000 A | 8/1990 | Grabenkort | |
| D332,551 S * | 1/1993 | Fields | D7/524 |
| D333,591 S | 3/1993 | Gradecki et al. | |
| D359,197 S | 6/1995 | Hernandez et al. | |
| D373,706 S | 9/1996 | Gregg | |
| 5,551,582 A | 9/1996 | Robinson | |
| 5,570,797 A | 11/1996 | Yeh | |
| D377,737 S | 2/1997 | Kristnik | |
| 5,662,233 A | 9/1997 | Reid | |
| 5,947,310 A | 9/1999 | Wagner | |
| 5,975,322 A | 11/1999 | Reid | |
| 6,006,930 A | 12/1999 | Dreyer et al. | |
| 6,062,408 A | 5/2000 | Beck et al. | |
| 6,105,801 A | 8/2000 | Minnette | |
| 6,109,515 A | 8/2000 | Duboff | |
| 6,164,473 A | 12/2000 | Waldrip | |
| 6,216,897 B1 | 4/2001 | Wagner | |
| 6,237,791 B1 | 5/2001 | Beck et al. | |
| D452,634 S * | 1/2002 | Weinberg | D7/524 |
| 6,398,050 B1 | 6/2002 | Allora | |
| 6,662,959 B1 | 12/2003 | Westerhold | |
| 6,712,232 B2 | 3/2004 | Tanaka et al. | |
| D497,773 S * | 11/2004 | Riedel | D7/524 |
| 6,820,743 B2 | 11/2004 | Hurley et al. | |
| 6,905,038 B2 | 6/2005 | Lopez | |
| 6,968,965 B1 | 11/2005 | Cunningham | |
| D541,109 S * | 4/2007 | Rocha | D7/524 |
| 7,467,726 B1 | 12/2008 | Izraelev | |
| D611,302 S * | 3/2010 | Specht | D7/524 |
| D621,662 S * | 8/2010 | Karaca | D7/524 |
| 7,770,748 B2 | 8/2010 | Elliott | |
| 7,950,545 B1 | 5/2011 | Roberts | |
| 7,997,434 B2 | 8/2011 | Benetti | |
| D644,938 S | 9/2011 | Saunders et al. | |
| 8,083,094 B2 | 12/2011 | Caulfield et al. | |
| D659,477 S | 5/2012 | Sapire | |
| 8,196,764 B2 | 6/2012 | Bernstein | |
| D663,166 S * | 7/2012 | Sapire | D7/537 |
| 8,328,014 B2 | 12/2012 | Saunders et al. | |
| 8,511,493 B2 * | 8/2013 | Bernstein | A47G 19/2205 215/200 |
| 9,282,837 B2 * | 3/2016 | Scott | A47G 19/2205 |
| D756,713 S * | 5/2016 | Scott | D7/537 |
| D760,593 S * | 7/2016 | Scott | D7/510 |
| 9,723,938 B2 * | 8/2017 | Albers | A47G 19/2205 |
| 9,821,930 B1 | 11/2017 | Bergida et al. | |
| 2001/0052508 A1 | 12/2001 | Wagner | |
| 2002/0104819 A1 * | 8/2002 | Matsui | B65D 1/0276 215/377 |
| 2003/0019364 A1 | 1/2003 | Carvin | |
| 2003/0057173 A1 | 3/2003 | Wagner | |
| 2003/0070951 A1 | 4/2003 | Hurley et al. | |
| 2003/0178427 A1 | 9/2003 | Chomik | |
| 2004/0069740 A1 | 4/2004 | Athalye | |
| 2004/0118804 A1 | 6/2004 | Westerhold | |
| 2004/0247749 A1 | 12/2004 | Lambert et al. | |
| 2005/0045632 A1 | 3/2005 | Lopez | |
| 2005/0092760 A1 | 5/2005 | Westerhold | |
| 2005/0139570 A1 | 6/2005 | Lambert et al. | |
| 2005/0230341 A1 | 10/2005 | Dong | |
| 2006/0016820 A1 | 1/2006 | Himes et al. | |
| 2006/0073241 A1 * | 4/2006 | Vallentine | B65D 85/72 426/106 |
| 2007/0266755 A1 | 11/2007 | Cook et al. | |
| 2008/0053949 A1 | 3/2008 | Farrar et al. | |
| 2008/0257848 A1 | 10/2008 | Farrar et al. | |
| 2008/0308555 A1 | 12/2008 | Stolzman et al. | |
| 2009/0001043 A1 | 1/2009 | Benetti | |
| 2009/0194537 A1 | 8/2009 | Zago et al. | |
| 2009/0218345 A1 | 9/2009 | Elliott | |
| 2009/0242503 A1 | 10/2009 | Kuboi et al. | |
| 2010/0044335 A1 | 2/2010 | Blake | |
| 2010/0163559 A1 | 7/2010 | Towers | |
| 2010/0263329 A1 | 10/2010 | Nash | |
| 2010/0294770 A1 | 11/2010 | Wing et al. | |
| 2011/0132781 A1 | 6/2011 | Willat et al. | |
| 2011/0168594 A1 | 7/2011 | Saunders et al. | |
| 2011/0174763 A1 | 7/2011 | Kennedy | |
| 2012/0043296 A1 | 2/2012 | Morris | |
| 2012/0233968 A1 | 9/2012 | Bernstein | |
| 2013/0075356 A1 | 3/2013 | Bergida et al. | |
| 2014/0008375 A1 | 1/2014 | Zanus et al. | |
| 2014/0299601 A1 | 10/2014 | Schiavone | |
| 2014/0332495 A1 | 11/2014 | Choi et al. | |
| 2015/0368003 A1 | 12/2015 | Freedman et al. | |
| 2018/0132638 A1 | 5/2018 | Bergida et al. | |

FOREIGN PATENT DOCUMENTS

| | | |
|---|---|---|
| EP | 1447334 A1 | 8/2004 |
| GB | 2370555 A | 7/2002 |
| KR | 20020048533 A | 6/2002 |
| WO | 9937190 A1 | 7/1999 |
| WO | 0012404 A1 | 3/2000 |
| WO | 2007090439 A1 | 8/2007 |

* cited by examiner

PRE-FILLED WINE GLASS PRODUCT

CROSS-REFERENCES TO RELATED APPLICATIONS

This is a continuation of U.S. application Ser. No. 14/177,387, filed Feb. 11, 2014, which is a continuation-in-part of U.S. application Ser. No. 13/240,194 filed Sep. 22, 2011.

U.S. application Ser. No. 14/177,387, filed Feb. 11, 2014, is also a continuation-in-part U.S. application Ser. No. 14/029,020, filed Sep. 17, 2013, which is a continuation-in-part of U.S. application Ser. No. 13/240,194 filed Sep. 22, 2011, and which claims the benefit of Provisional Application No. 61/703,637 filed Sep. 20, 2012.

U.S. application Ser. No. 14/177,387, filed Feb. 11, 2014, also claims the benefit of Provisional Application No. 61/895,028 filed Oct. 24, 2013.

The contents of all of the above-referenced applications are hereby incorporated by reference as though fully set forth herein.

BACKGROUND

A known class of consumer product is the pre-filled wine glass product.

The product is a sealed vessel in the shape of a drinking glass typically made of plastic. Thus even though the present specification makes reference to a "drinking glass" or "wine glass," it is to be understood that the word "glass" is being used in the sense of a vessel, irrespective of the material that the vessel is made from. As implemented in the prior art, the pre-filled wine glass product is sealed with a seal that is secured to the drinking rim adhesively—it typically being a metal foil seal sealed onto the rim using an induction seal process.

Figure 1A:
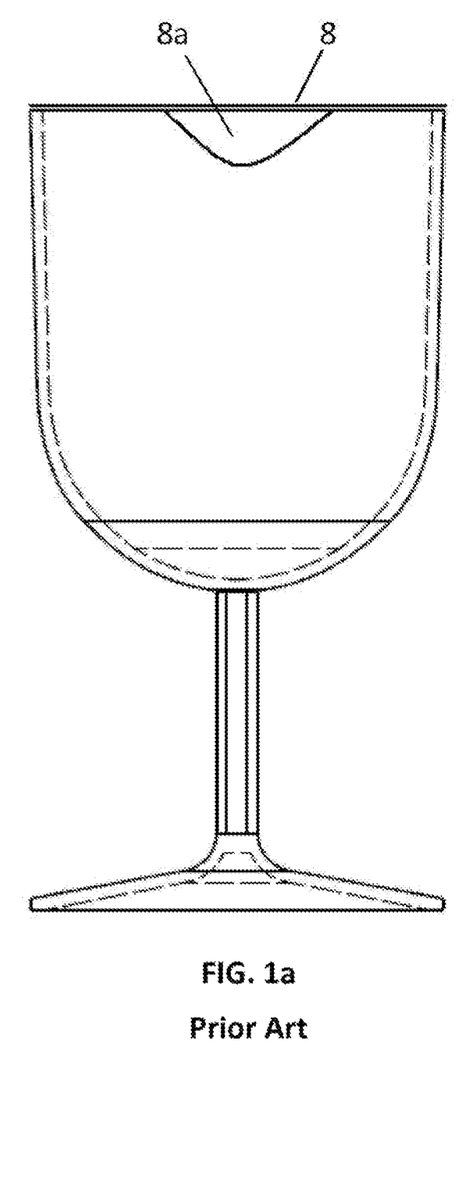
FIGS. 1a and 1b are side perspective views of pre-filled wine glass products having adhesively secured seals per the prior art.
Figure 1B:
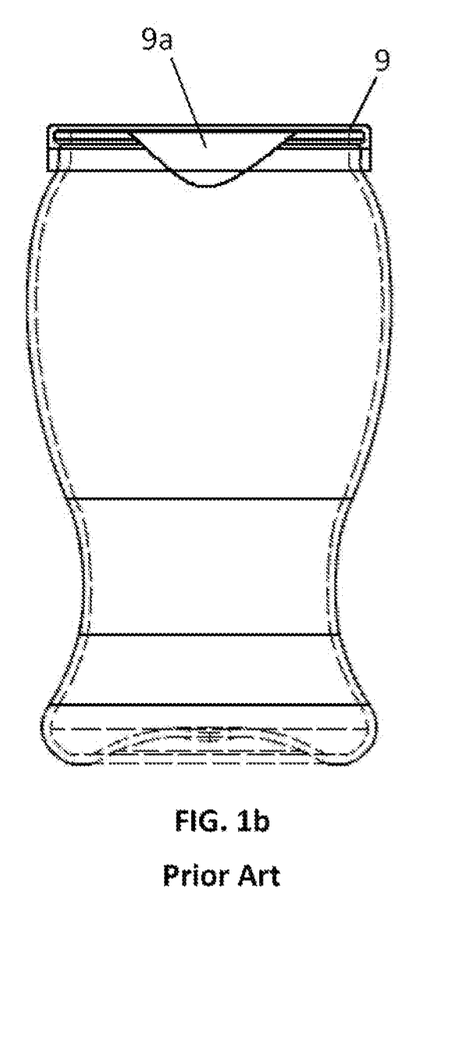

The wine glass itself may comprise a bowl having a stem connected to a pedestal base, in the familiar stemmed wine glass shape. An example of this, shown in FIG. 1a, is the single-serve pre-filled wine glass product currently marketed under the "The Italian Job" and "Le Froglet" brands, both of which use the so-called Tulip wine glass manufactured by Wine Innovations Ltd, of New Malden, Surrey, United Kingdom. In FIG. 1a, the foil seal is indicated at 8 and has a pull tab 8a. Other prior art pre-filled wine glass products have a tumbler-shaped glass. An example of this, shown in FIG. 1b, is the pre-filled wine glass product marketed under the "Copa di Vino" brand by Copa Divino of The Dalles, Oregon. The foil seal is not visible in FIG. 1b because this particular product is sold with a plastic overcap 9 which snaps onto the glass to overlay and thus protect the foil seal. A pull tab 9a of the foil seal does, however, protrude from underneath overcap 9.

SUMMARY

We discovered upon entering into the pre-filled wine glass field and endeavoring to design a pre-filled wine glass product for the consumer market that that the pre-filled wine glass product as known in the prior art is less than optimal from both the consumer and manufacturing points of view, as detailed hereinbelow. Such failure seems to be a major reason that the market for this class of product has been, and remains, quite small as compared to what we believe to be its potential. Indeed, having spoken to many executives in the wine industry as we pursued our design efforts, we have concluded that the ongoing niche nature of this market is the result of a failure on the part of the wine industry a) to recognize how crucial it is to provide a wine glass/closure combination that is both really pleasing to consumers while being able to be mass-produced and transported at acceptable cost and/or b) to break from its conventional ways of thinking about the marketing and packaging of wine.

What we have specifically come to recognize, in accordance with the principles of the invention, is the desirability of using a rigid lock-on cap as the mechanism for sealing a pre-filled wine glass product. We use the term "rigid lock-on cap" to differentiate the class of closures used in our invention from the prior art adhesively secured seal. Thus the term "rigid lock-on cap" as used herein encompasses any type of rigid closure that serves as the mechanism for sealing the wine in the wine glass other than with an adhesive, such as by way of twist threads, lugs or other engagement features on the wine glass that enable the cap to be twisted and/or snapped onto, and off of, the wine glass.

By contrast, every prior art pre-filled wine glass that we are aware of uses an adhesively secured seal to seal the wine within the wine glass. None of them use a rigid lock-on cap for this purpose. (Some of the prior art pre-filled wine glass products do have a plastic snap-on overcap over the seal, as in FIG. 1b. However, the wine is actually sealed in the glass by the adhesively secured seal and not the overcap, which is not leak-proof. The overcap simply serves to keep the adhesively secured seal clean so that the wine will not be contaminated by any dirt or other foreign substance at the point when the product is to be opened. The overcap also protects the seal from being accidentally punctured.)

We, by contrast, have recognized as detailed below that there are many advantages to using a rigid lock-on cap instead of a foil, or other adhesively secured, seal for pre-filled wine glass products.

It might be thought that a rigid lock-on cap would be an obvious substitute for an adhesively secured seal since both are known container closures. However, providing a rigid lock-on cap for a pre-filled wine glass is something that would not have been obvious to the person skilled in the art.

There are number of specific factual reasons that this is so, each pointing to the nonobviousness of the invention.

Firstly, there are no pre-filled drinking glass products for any kind of beverage that have a rigid lock-on cap, let alone for wine. Rigid lock-on caps are, of course, used on bottles and other beverage containers from which consumers typically pour the beverage into a drinking glass. But there is no pre-filled beverage container with a rigid lock-on cap where the container itself is in the form of a drinking glass. A drinking glass is defined as a wide mouth container for a beverage. When the user drinks from the rim, typically the nose enters inside the container beyond the rim.

Thus adhesively secured seals and rigid lock-on caps are not known or obvious equivalents of one another—at least in the sphere of pre-filled wine glass products. Again, this is because nobody has thought to use a rigid lock-on cap for any pre-filled beverage glass product. It would only be by way of hindsight, then, given the benefits of our teachings herein, that one would be led to substitute a rigid lock-on cap for the foil closure of the prior art pre-filled wine glass product.

Moreover, workers in the industry believe that pre-filled wine glass products must have a foil or other adhesively secured seal because they believe that twist threads or other engagement features right at the drinking rim of the pre-filled single-serving wine glass, a concomitant of the traditional rigid lock-on cap, would necessarily be rejected by wine consumers for aesthetic reasons.

Moreover, there is a long list of problems inherent in the use of an adhesively secured seal for a pre-filled wine glass product. The problems are so numerous and significant that those skilled in the art have had every motivation to come up with an alternative closure for the pre-filled wine glass product market. The fact is, however, that they have not conceived of it. Indeed, the producers of every pre-filled wine glass product on the market use an adhesively secured seal closure and have done so throughout the entire six-year history of this market, beginning with the first such product—the Tulip glass introduced in 2007—and continuing to this day.

The following are among the above-referenced problems:

A pre-filled wine glass product sealed with an adhesively secured seal requires a flat-across-the-top, sharp-edged drinking rim that is often scored or has bumps to allow for the seal to adhere better. A flat—across-the-top drinking rim with scores or bumps—and, possibly, some residual bits of the seal on the drinking rim after the seal is removed by the consumer—work against the consumer's enjoyment of the wine-tasting and wine-drinking experience.

A pre-filled wine glass product sealed with an adhesively secured seal cannot be securely re-sealed. This is a problem because the United States Code of Federal Regulations, Title 27, Section 4.71(3) prescribes that wine sold in containers for consumer sale can have only a limited amount of space—referred to as "headspace"—not taken up with the wine. Thus if the pre-filled wine product is served to guests at a venue where the guests will be standing and/or walking about, such as at a corporate reception, there is a tendency for the wine to spill out until some of it has been consumed because the drinking glass, when initially opened, will be filled close to the top. Even if the consumer were to only partially remove the seal with the idea of resealing it, the adhesively sealed wine glass cannot, in fact, be securely re-sealed. Wine can spill even if the consumer puts her hand over the pushed-back-down seal as she walks. She may even bump into some person or thing and the wine may spill that way. Moreover, even if the glass could be resealed, drinking wine from a glass with a piece of foil sticking up from the rim makes for an inelegant and thus displeasing drinking experience. The uplifted foil may even wet the drinker's nose. Additionally, the inability to securely reseal the drinking glass makes it difficult and/or inconvenient for the consumer to save partially consumed contents for later consumption without concern about the contents being contaminated or spilled if the wine glass is left unattended.

A pre-filled wine glass product sealed with an adhesively secured seal is awkward to open since as one is peeling off the seal, one needs to take care to not jar the drinking glass and thereby cause wine to slosh out.

A pre-filled wine glass product sealed with an adhesively secured seal requires the use of adhesive-seal-application machines which have a relatively slow throughput and which may require one or more handworkers to handle the glasses in the filling/capping process. As a result, pre-filled wine glass products with adhesively secured seals are not amenable to being filled on existing high-speed filling/capping lines.

The above and perhaps other problems are solved by the use of a lock-on cap for a prefilled wine glass product pursuant to the principles of the present invention.

Specifically, from a consumer perspective:

A lock-on cap for a pre-filled wine product allows for the use of a rounded drinking rim, as compared to the flat—across-the-top, sharp-edged, and possibly scored or bumpy, drinking rim required by the adhesively secured seal, the latter being something that works against the consumer's enjoyment of the wine-tasting and wine-drinking experience.

A lock-on cap for a pre-filled wine product leaves a clean rim upon removal, as compared to the residual bits of the seal that may be left on the drinking rim when an adhesively secured seal is used.

A lock-on cap for a pre-filled wine product can be securely re-sealed, thereby avoiding the spillage problem that can occur with the non-resealable adhesively secured seal. Moreover, being able to securely re-seal the drinking glass makes it practical for the consumer to save partially consumed contents for later consumption without concern for contamination or spilling.

A lock-on cap for a pre-filled wine product can be readily removed (e.g. twisted off) with less potential for spilling the wine at the point in time that the closure is opened than is the case when one is faced with having to carefully peel off an adhesively secured seal.

A lock-on cap for a pre-filled wine product may create less debris since the cap is useful to the consumer once removed from the glass whereas the foil seal is not.

And from the producer's/manufacturer's perspective:

A lock-on cap for a pre-filled wine product can be applied to the drinking glass using conventional high-speed filling and capping equipment at a rate of at least 100 bottles per minute—as compared to what we estimate to be a filling rate of no more than 60 per minute for adhesively secured seals—making the product more amenable to economical high-speed mass production.

Beyond the fact that there are problems with the adhesively secured seal that should have motivated the industry to look for alternatives, there are particular advantages to our particular solution to those problems. These advantages have stood as further motivation for the industry to have come up with our particular solution. The fact that they have not come up with it even further evinces the invention's non-obviousness.

Among those advantages are the following:

Rigid lock-on caps can be applied by standard capping machines, reducing the per-piece manufacturing cost.

Development of new closure mechanisms is expensive and difficult, but since the use of twist-on caps or other lock-on caps is a well developed art outside of the pre-filled wine glass product space, it would not require an overly large effort or expense for the current pre-filled wine glass product producers to adopt this innovation.

A pre-filled wine glass product with a rigid lock-on cap can be designed to have a smooth surface on the outside surface of the glass at and near the rim by displacing the twist threads or other cap-engagement features lower down on the glass, as disclosed in our above-referenced co-pending patent applications.

The advantages that having a lock-on cap provides for the consumer as enumerated above would provide a pre-filled wine glass product producer with a marketing edge over competitors who stuck with the prevailing adhesively-secured seal approach.

The industry has clearly been asleep at the switch, but after having investigated this matter and having talked to people in the industry, we believe we understand at least some of the reasons why.

Firstly, tradition plays a big role in the wine marketplace and directs what kinds of packaging producers think consumers will accept. Indeed, wine consumers seem to resist change. For example, in a market study conducted by "Vinitrac: The global wine drinker survey" in 2007, less than half of wine drinkers said would continue to buy their usual wine if the packaging were changed from glass to some alternative type of packaging. Certainly a wine glass with an adhesively secured seal looks a bit more like a traditional wine glass than one with a lock-on cap since the adhesively secured seal lies flat across the top of the glass. Hence, the industry might well be loathe to spend any time thinking about problems with their current offerings if it would mean say, making a packaging change.

We have also noticed an if-it-ain't-broke-don't-fix-it mentality in our discussions with people in the wine industry. This, we believe, has added to the industry's not thinking about the needs of the market from a packaging perspective; has kept them from thinking, as we have thought, about what problems exist with the current product; and has kept them from even trying to envision how their product might be better. They just don't seem all that interested.

It is said that "where there is a will, there is a way." It is our observation that no one in the pre-filled wine glass industry has thought of our "way" because they have little, if any, "will" to make improvements. The fact that we were novices in this field at the time that the pre-filled wine glass market was already established has proven to be a major advantage in that our thinking was not biased by old thinking and "comfortable" ways of doing things. It thus remained for us to recognize that which the entrenched industry has not. Indeed, as the Nobel Prize winner, Albert von Szent-Gyorgy, has observed, discovery consists of seeing what everybody has seen and thinking what nobody has thought.

DETAILED DESCRIPTION

With reference to FIGS. 2a-2d and 3, a pre-filled wine glass product 10 embodying the principles of the invention is shown. The pre-filled wine glass product comprises a drinking glass 11 and a resealable rigid lock-on lid, or cap, 12. A portion of wine 38 is sealed within the drinking glass.

The drinking glass may be made from any appropriate material including but not limited to, glass or a plastic material such as food grade polycarbonate. Thus, although the word "glass" is used at various points throughout this specification, it is to be understood that the word "glass" is being used in the sense of a drinking vessel, irrespective of the material that the vessel is made from.

Drinking glass 11 includes a top portion, or bowl, 19 that holds the wine contents 38. The bowl comprises an open top end, or drinking rim, 24, a bottom end, or base, 26, and at least one sidewall 28.

The bowl is supported by a pedestal 41 sitting on a pedestal base 42.

The amount of wine contained in a pre-filled wine glass is one of the amounts of "fill" allowed by federal regulation—specifically, Code of Federal Regulations, Title 27, Sections 4.71 and 4.72 (i.e. 27 CFR 4.71-72.). Typically the fill of a pre-filled wine glass product is 187 ml, as the federal regulation permits.

Figure 2A:
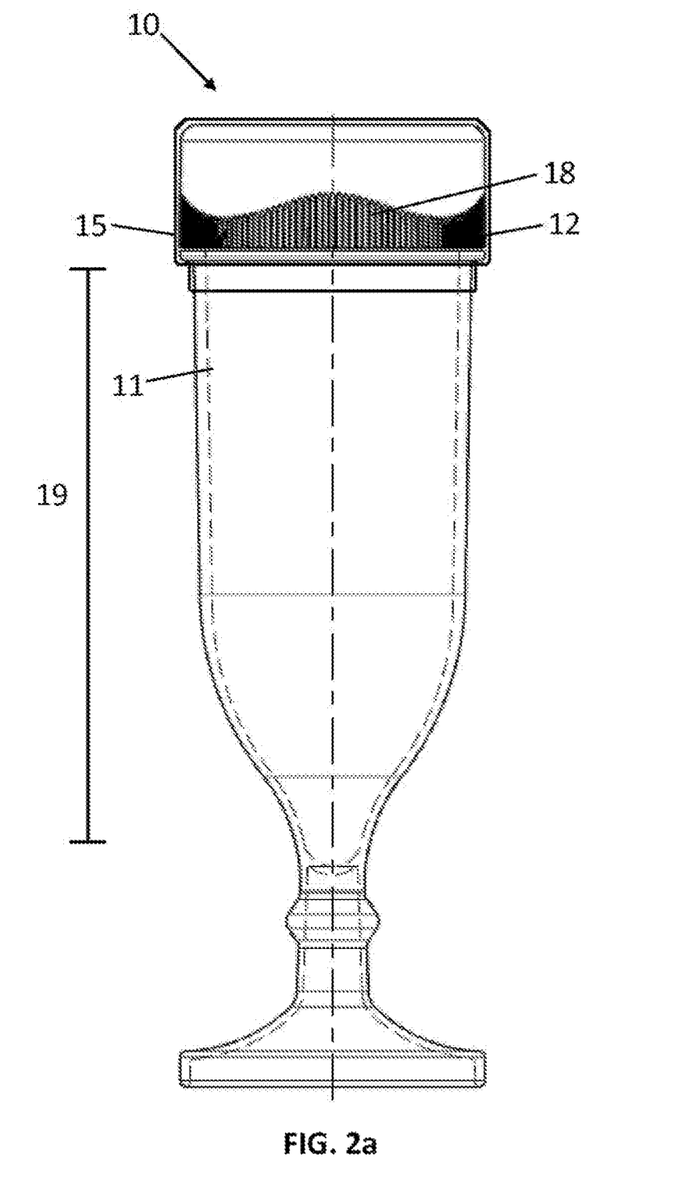
FIG. 2a is a side view of an embodiment of a pre-filled wine glass product comprising a drinking glass and, in accordance with the principles of the invention, a rigid lock-on cap, with the cap being shown secured into place on the glass.
Figure 2B:
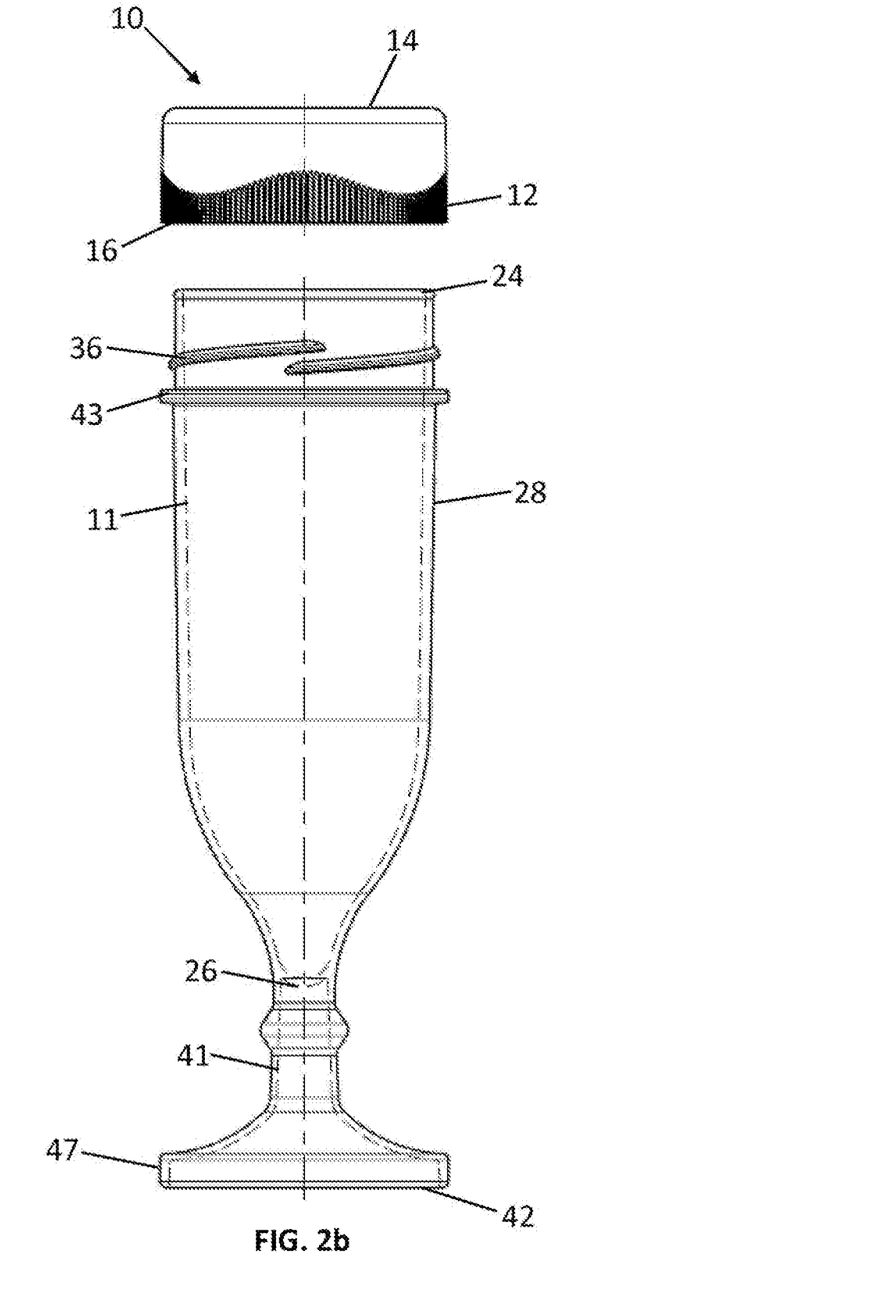
FIG. 2b is a side view perspective view of the pre-filled wine glass product wherein the rigid lock-on cap has been removed from the glass.
Figure 2C:
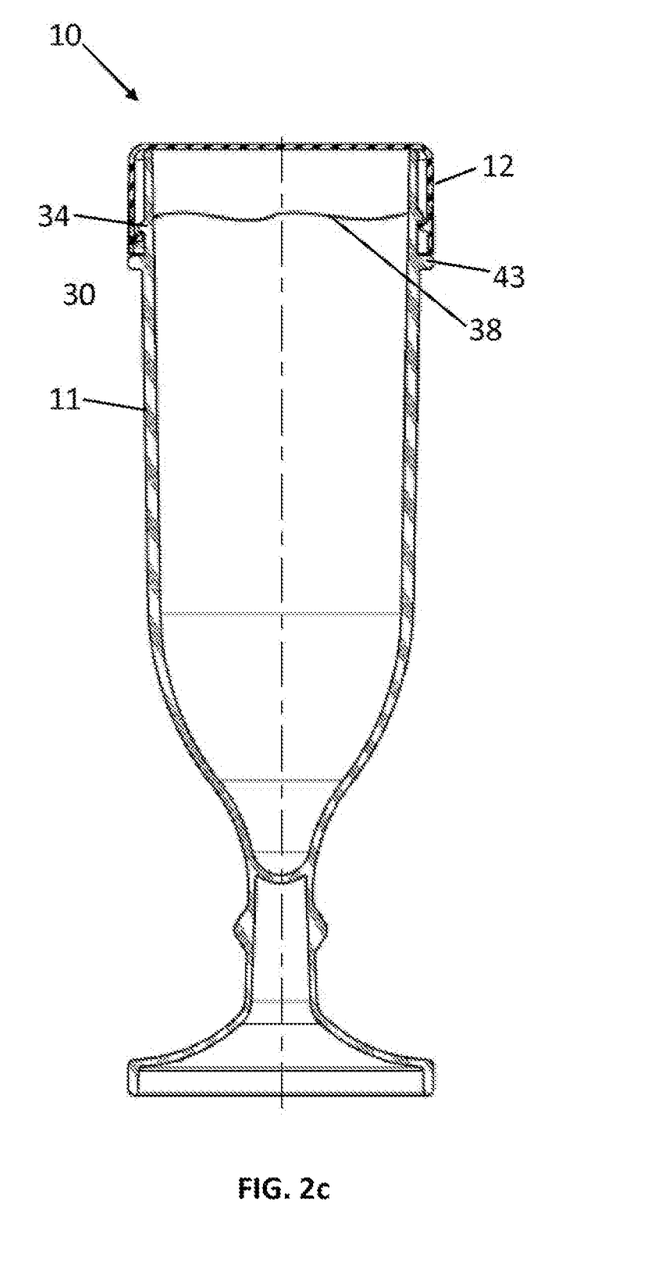
FIG. 2c is a view of the pre-filled wine glass product with the rigid lock-on cap secured into place on the glass, as in FIG. 1a, but here in cross-section.
Figure 3:
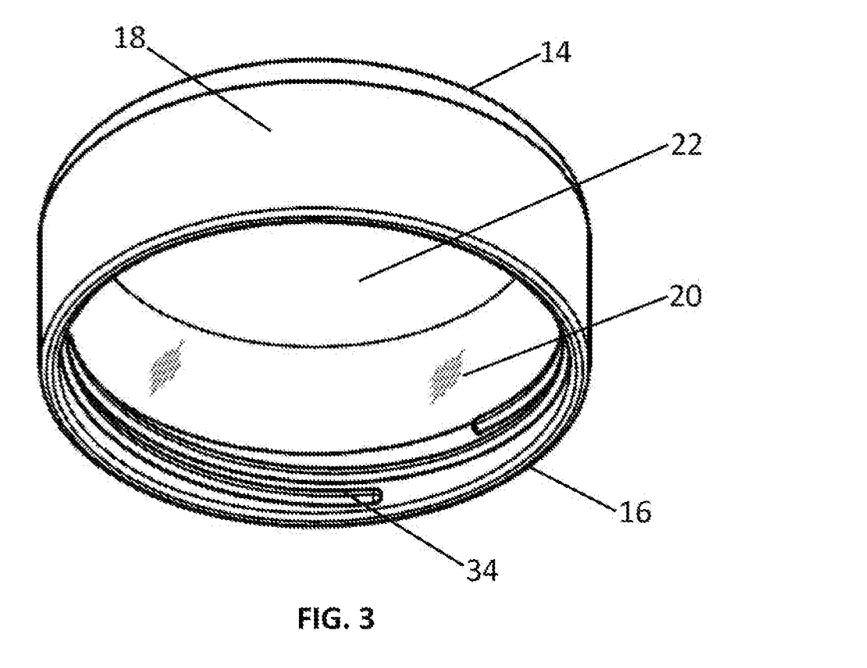
FIG. 3 is a bottom perspective view of the rigid lock-on cap used in the pre-filled wine glass product.
Figure 4:
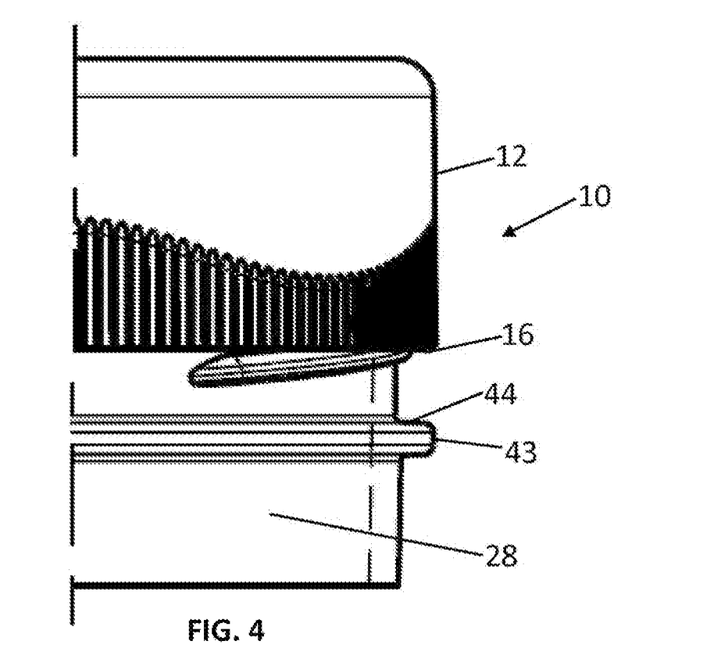
FIG. 4 is an enlarged side perspective view of a portion of the pre-filled wine glass product, with the rigid lock-on cap having been partially untwisted.
Figure 5:
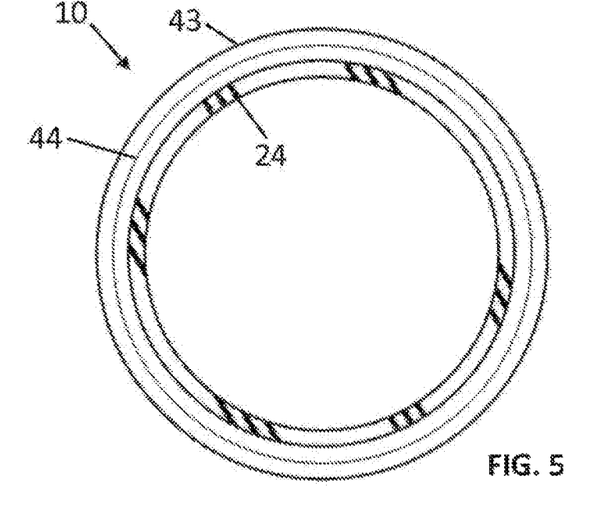
FIG. 5 is a top view of the uncapped drinking glass of the pre-filled wine glass product.

Cap 12 has a top end 14, a bottom rim 16, a sidewall 18, an interior side surface 20, and engagement features 34—illustratively twist threads—on the interior side surface 20 near bottom rim 16. Cap 12 may be made from any appropriate material including but not limited to plastic, aluminum, a metal alloy, or some combination thereof.

A resilient liner 22 is located on the interior surface of the top end 14. Liner 22 is a liquid-resistant coating or a separate compressible insert of a type known in the art—made often from a polymer/pulp combination. Liner 22 assures sealing integrity by enabling the cap to tightly seal off the top end, or rim, 24 of the drinking glass and preserve the freshness of wine contents 38.

The drinking glass and cap are configured to allow at least for the cap to be twisted off, or otherwise removed, by a consumer after having been twisted on and sealed—or otherwise put in place—by a manufacturer or bottler. In the illustrated embodiments, the cap can be twisted onto and off of the drinking glass any number of times, resealing the drinking glass so as to prevent accidental spillage as well as to store the beverage for another occasion. To this end, twist threads 36 on the exterior surface 28 of drinking glass 11 interlock with the twist threads 34 on the inside surface 20 of the cap 12, thus tightening the cap 12 and bringing the liner 22 into contact with rim 24 and creating a liquid-tight seal.

The part of exterior surface 28 of drinking glass 11 extending upwardly from the twist threads may taper as it approaches the drinking glass rim 24. This enables a consumer to comfortably consume wine at the drinking glass rim 24. The cap 12 comes down over this tapered region when the cap is in its twisted-on position. The sidewall 28 below the twist threads 36 is thick enough to resist breakage from contact with other (capped or uncapped) drinking glasses during filling and shipping.

Although not shown in the FIG., a tamper-evident seal, tape, label or the like can be affixed to the product spanning the gap between the drinking glass 11 and the cap 12.

Extending around the outside surface 28 of drinking glass 11 is a ledge 43, which serves a number of advantageous roles.

Firstly, as part of our investigation into what would be desirable in order to be able to use high-speed filling and capping machinery to produce a pre-filled wine glass product with a rigid lock-on cap, we recognized that product moved along the filling and capping line will be both capped and uncapped at various different points in the process, and that in order to keep the capped and uncapped glasses from being tipped over as they are moved above, it would be desirable to have two contact points between neighboring glasses both before they are capped and afterwards.

Figure 2D:
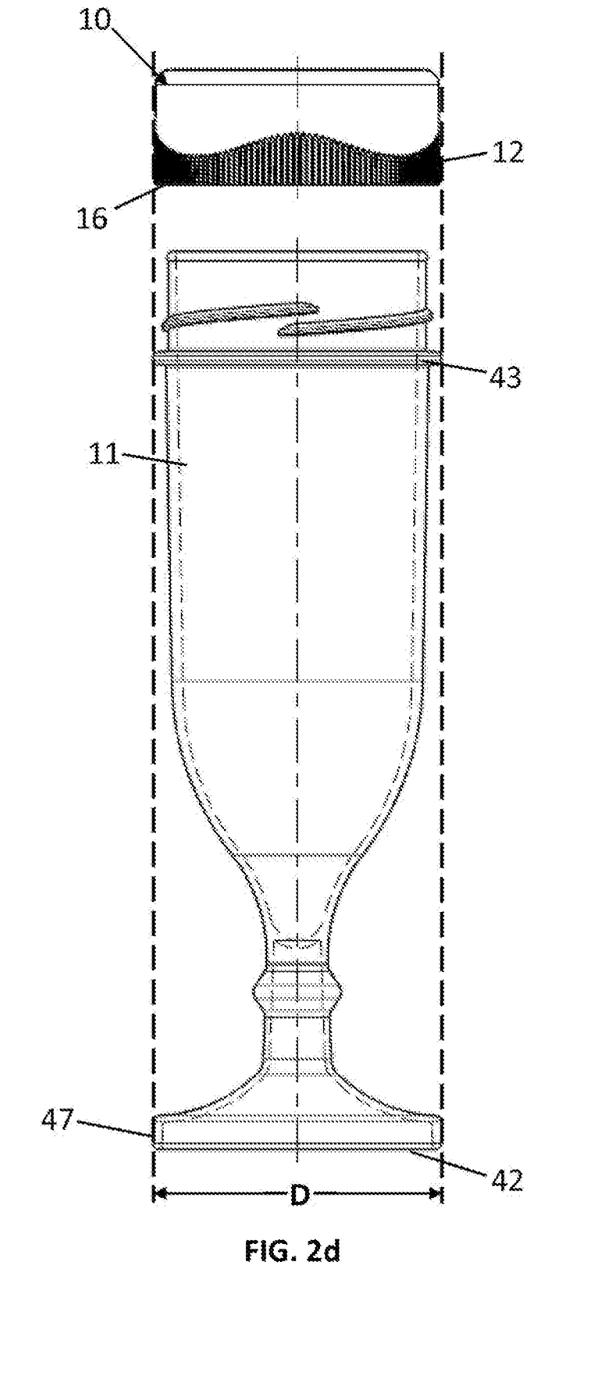
FIG. 2d shows the same view as FIG. 2b but presented to highlight that, in the disclosed embodiment, the drinking glass pedestal base, the bottom of the cap and the outside edge of a circumferential ledge extending around the outside surface of the drinking glass all have the same diameter.

In the present embodiment, one of the contact points is the edge 47 of the pedestal base 42. When the drinking glass is uncapped, the other contact point is ledge 43. To this end, pedestal base 42 and ledge 43 and the bottom rim 16 all have the same diameter D, as shown in FIG. 2*d*. When the drinking glass is capped, the other contact point is, again ledge 43 but also possibly also bottom rim 16 of cap 12 if, as shown in FIG. 2*d*, cap 12 has that same diameter D. In any event, the diameter of bottom rim 16 should not be any larger than D (although it could be smaller) because this would prevent adjacent glasses from having a contact point at their pedestal bases 42.

Other embodiments may have a drinking glass that is generally similar to drinking glass 11 but without ledge 43. In such embodiments, the second point of contact could be a point on cap 12 having the diameter D. In the disclosed embodiment, diameter D is, in fact, the diameter of bottom rim 16. In other embodiments the cap might be shaped such that second point of contact is at a position along the side of cap that is different from bottom rim 16. In yet other embodiments, the wine glass may have a diameter D at some point along side wall 28 with the cap maximum diameter being less than D, in which case that point on side wall 28, rather than any point on the cap, could serve as the second point of contact. Moreover, any of the above possibilities vis-à-vis the cap, the ledge and/or the drinking glass might be implemented in conjunction with a round pedestal base whose diameter is less than D. In such embodiments, the drinking glass could, for example, be made to travel through the filling and capping line secured in a puck with diameter D so that the edge of the puck would serve as the second point of contact.

As to the magnitude of the diameter D, we have come to recognize that in the production of a pre-filled wine glass product with a rigid lock-on cap, it would be desirable to be able to use existing high speed filling lines that are manufactured to fill and cap bottles or other vessels. Our investigation into that part of the beverage world revealed that there are a limited number of standardized maximum diameters, or "cylinders," for the vessels.

Those standardized diameters that appear to be the most popular are 6 cm, 6.6 cm, and 7.3 cm. Indeed, particular embodiments of pre-filled wine glass products embodying the principles of the invention glasses have one of those standardized diameters, with 6 cm being a particular choice that allows for a vessel size that meets the requirements of 27 CFR 4.71-72 regarding, for example, volumes and headspace for a pre-filled wine glass product containing 187 ml of wine. In this way, pre-filled wine glass products can be filled and capped without bottlers having to adjust various rails and other parts of their machinery to accommodate some non-standard "cylinder."

In particular embodiments, such as that shown herein, ledge 43 can be located immediately below the bottom rim 16 of the cap when the cap is in place. In some embodiments, bottom rim 16 may actually seat on ledge 43 when the cap is in the fully twisted-on position. In others, there may be a selected—typically quite small—distance between bottom rim 16 and ledge 43 when the cap is in its fully twisted-on position. In either case, the cap will have the appearance of "sitting on" the ledge, which helps the product to look sleek and streamlined.

Figure 6:
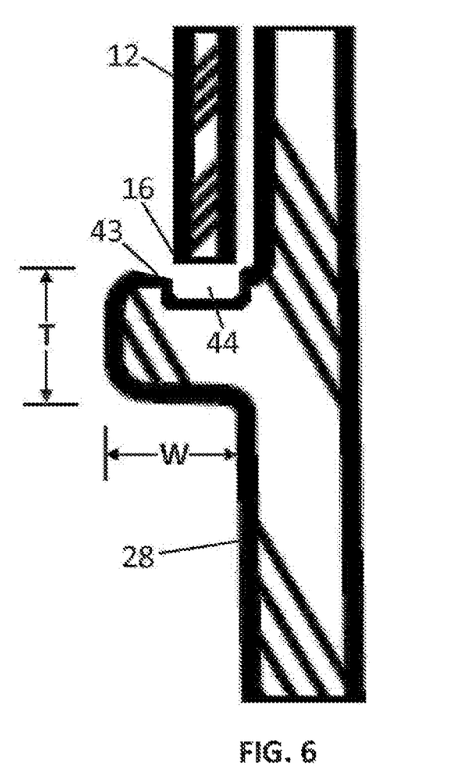
FIG. 6 is an enlarged side cross-sectional view of a portion of the drinking glass portion of the pre-filled wine glass product showing an illustrative profile for the above-mentioned circumferential ledge on the drinking glass.

The present illustrative embodiment actually adopts the former approach. That is, bottom rim 16 is actually seated on ledge 43 when the cap is in the fully twisted-on position. This, advantageously, creates a liquid-resistant barrier that helps to prevent liquid penetration under the cap from the outside, such as when the pre-filled wine glass product is placed in a tub of ice water. Such penetration could contaminate the region of the drinking glass above the twist threads 36, which region is contacted by the consumers' lips when the wine is being drunk. There is in this embodiment a groove 44 formed in ledge 43. Bottom rim 16 straddles groove 44 when cap 12 is fully twisted onto drinking glass 11. We have found that the presence of groove 44 enhances the barrier function. When the bottom rim 16 fits into the groove 44, the inside edge of the bottom rim is somewhat shielded by the groove, thus enhancing the barrier function. We have found that barrier function is further enhanced if the top of ledge 43 is either slightly concave or, as depicted in FIG. 6, is slightly slanted inward. The degree of inward slant is exaggerated in FIG. 6 to more clearly illustrate the inward slanting. Again, the ledge marries up with the edge of the bottom rim to form a barrier to liquid coming up inside the cap. A further advantage of the presence of ledge 43 is that it is something that mechanical equipment can grab onto in order to pick up the capped or uncapped drinking glass during the filling and/or capping process.

Something else we have come to recognize is that stemmed glasses, when moved along high-speed conveyors and the like, might tend to "shingle," meaning that a pedestal base—particularly a round pedestal base—might slip onto, and/or scrape on, the pedestal base of the glass next to it, potentially causing the filling-line to jam or potentially causing a glass to tip over. We have specifically recognized that the typical pedestal base edge height of pre-filled wine glass products in the marketplace—which is about 1 mm—might well give rise to this shingling problem. Traditional stemmed glassware with a rounded pedestal base has an edge height of around 2 mm and we believe that that edge height, too, can give rise to the shingling problem. The pedestal base edge 47 of the pre-filled wine glass product disclosed herein illustratively has a pedestal base edge height H of at least 3 mm, which, we have found, will substantially eliminate shingling on a high-speed filling/capping line. Moreover, edge 47 illustratively has a flat profile (i.e. would appear as a straight vertical line in a cross-sectional view), rather than having a rounded profile as is characteristic of the pedestal bases of many stemmed wine glasses. This flat profile, we have discovered, serves to prevent shingling.

As noted above, and with reference to FIG. 7, the use of a rigid lock-on cap permits the wine glass rim 24 to have a rounded profile 24*a* at least at the outside surface of the glass, which is more familiar and, no doubt, more pleasing to the consumer who is used to drinking from a normal wine glass, which, in fact, has rounded a drinking rim.

Figure 7:
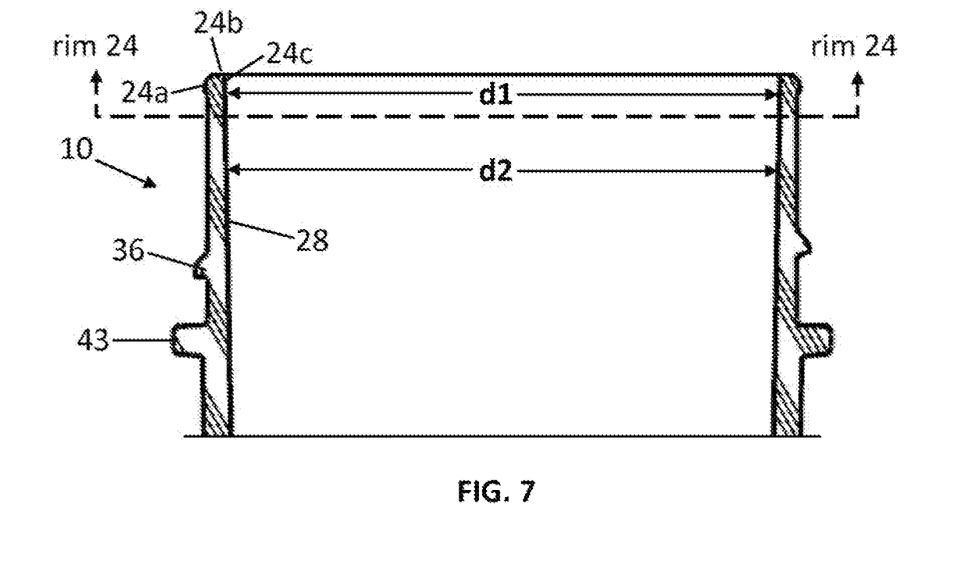
FIG. 7 is an enlarged side cross-sectional view of a portion of the drinking glass portion of the pre-filled wine glass product showing an illustrative profile for the drinking rim of the drinking glass.

We have further recognized that it is desirable in particular embodiments, such as when the wine glass is injection-molded, for the rounded drinking rim to not extend into the interior of the bowl. That is, the diameter d1 of the drinking rim measured across the space across the inside of the mouth of the drinking glass is at least as great as the diameter d2 measured across that space just below the drinking rim. This allows for a straight and clear path for withdrawal of the wine glass bowl from the injection mold. Indeed, as seen in FIG. 7, the inside surface 24c of the drinking rim is a smooth, uninterrupted extension of the inside surface of side wall 28.

Even though the drinking rim may not be fully rounded, the rounded outside profile 24a on the outside surface of the drinking glass nonetheless substantially fulfills the goal of providing the consumer with the accustomed appearance and mouth feel of a rounded drinking rim—certainly much more so than with the flat-across-the-top drinking rim that is required when the wine glass is sealed with an adhesively secured seal.

Illustrative dimensions for pre-filled wine glass products embodying the principles of the invention are as follows:

| | |
|---|---|
| Height of glass 11 | 9 cm-30 cm |
| Height of bowl | 7 cm-14 cm |
| Diameter of pedestal base 42, ledge 43 and cap bottom rim 16 | 3.5 cm-9.0 cm, with 6 cm, 6.6 cm, and 7.3 cm being particularly advantageous |
| Height of pedestal base 42 at its outer edge 47 | 3 mm-10 mm |
| Diameter of stem 26 | 0.5 cm-3 cm |
| Thickness T of ledge 43 | 1 mm-3 mm |
| Width W of ledge 43 | 2 mm-5 mm |
| Height of stem 26 | 1 cm-10 cm |

Figure 8:
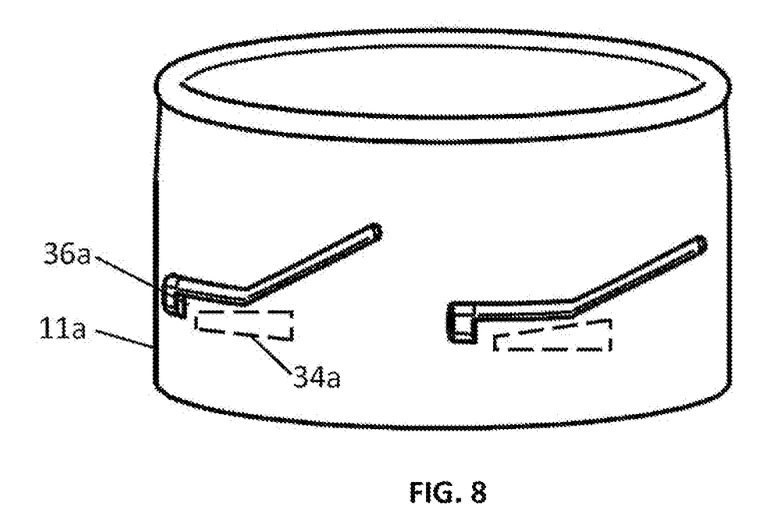
FIG. 8 shows an alternative form of engagement features for the drinking glass.
Figure 9:
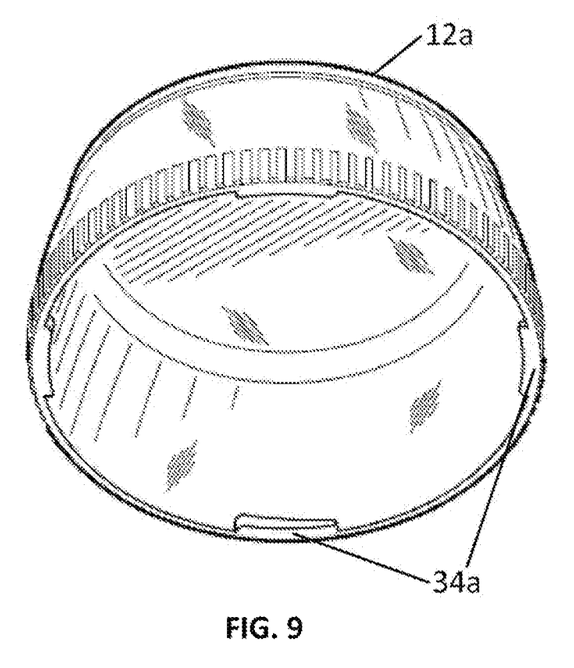
FIG. 9 shows a cap with engagement features appropriate to secure that cap to a drinking glass having the engagement features shown in FIG. 8.

The foregoing is merely illustrative. For example, although in the illustrative embodiment the engagement features on the drinking glass and cap are twist threads, various alternative engagement features could be used, including any of those disclosed in our above-cited copending patent applications. Specifically, FIGS. 8 and 9 show one possibility wherein drinking glass 11a, shown in FIG. 8, has ornamental engagement features 36a that are engaged by lugs 34a on the bottom rim of cap 12a, shown in FIG. 9. Lugs 34a are also shown in phantom in FIG. 8 to depict how they engage with engagement features 36a when cap 12a is fully twisted onto drinking glass 11a.

It will thus be appreciated that those skilled in the art will be able to devise numerous arrangements which, even if not shown or described herein, embody the principles of the invention and thus are within their spirit and scope.

What is claimed is:

1. A stemmed glass comprising:
a bowl possessing an open end defining a rim, the bowl also possessing an outer surface, the rim lying in a plane;
a circular base possessing an outer diameter;
a stem which is integrally formed with the bowl and the circular base to connect the bowl to the circular base, said stem possessing an outer diameter smaller than the outer diameter of the circular base;
a circular ledge disposed on the outer surface of the bowl in a plane that is substantially parallel to the plane of the rim, the circular ledge possessing an outer diameter; and
the stemmed glass is made from moldable man-made material other than glass and is configured so that, when the stemmed glass is arranged side-by-side with an identical stemmed glass, the circular ledge of the stemmed glass contacts the circular ledge of the identical stemmed glass,
wherein the circular ledge of the stemmed glass has a thickness of at least 1 mm and an outer edge with a flat profile in a cross-sectional view.

2. The stemmed glass of claim 1, wherein the circular ledge is a continuous circular ledge.

3. The stemmed glass of claim 2, wherein a top surface of the circular ledge of the stemmed glass has a groove formed therein.

4. The stemmed glass of claim 2, wherein at least a portion of a top surface of the circular ledge of the stemmed glass is concave.

5. The stemmed glass of claim 1, wherein the bowl contains a product.

6. The stemmed glass of claim 5, wherein the bowl is covered by a cap that removably seals and reseals the product inside.

7. The stemmed glass of claim 6, wherein the stemmed glass is configured so that, when the stemmed glass is arranged side-by-side with an identical stemmed glass, the cap of the stemmed glass contacts the cap of the identical stemmed glass.

8. The stemmed glass of claim 5, wherein the bowl is covered by a seal that secures the product inside.

9. A stemmed glass comprising:
a bowl possessing an open end defining a rim, the bowl also possessing an outer surface, the rim lying in a plane;
a circular base possessing an outer diameter;
a stem which is integrally formed with the bowl and the circular base to connect the bowl to the circular base, said stem possessing an outer diameter smaller than the outer diameter of the circular base;
a circular ledge disposed on the outer surface of the bowl in a plane that is substantially parallel to the plane of the rim, the circular ledge possessing an outer diameter;
a cap covering the bowl and configured to removably seal and reseal product inside the bowl; and
the stemmed glass is made from moldable man-made material other than glass and is configured so that, when the stemmed glass is arranged side-by-side with an identical stemmed glass, the cap of the stemmed glass contacts the cap of the identical stemmed glass,
wherein the circular ledge of the stemmed glass has a thickness of at least 1 mm and an outer edge with a flat profile in a cross-sectional view.

10. The stemmed glass of claim 9, wherein the circular ledge is a continuous circular ledge.

11. The stemmed glass of claim 10, wherein a top surface of the circular ledge of the stemmed glass has a groove formed therein.

12. The stemmed glass of claim 10, wherein at least a portion of a top surface of the circular ledge of the stemmed glass is concave.

13. The stemmed glass of claim 9, wherein the stemmed glass is configured so that, when the stemmed glass is arranged side-by-side with an identical stemmed glass, the circular ledge of the stemmed glass contacts the circular ledge of the identical stemmed glass.

\* \* \* \* \*